United States Patent
Xiao et al.

(10) Patent No.: US 12,452,346 B2
(45) Date of Patent: Oct. 21, 2025

(54) MULTIPATH TRANSMISSION METHOD AND DEVICE

(71) Applicant: HUAWEI TECHNOLOGIES CO., LTD., Guangdong (CN)

(72) Inventors: Yuren Xiao, Shanghai (CN); Haw-Wei Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 690 days.

(21) Appl. No.: 17/843,953

(22) Filed: Jun. 17, 2022

(65) Prior Publication Data

US 2022/0321455 A1 Oct. 6, 2022

Related U.S. Application Data

(63) Continuation of application No. PCT/CN2020/137149, filed on Dec. 17, 2020.

(30) Foreign Application Priority Data

Dec. 19, 2019 (CN) .......................... 201911315074.3

(51) Int. Cl.
*H04W 28/12* (2009.01)
*H04L 45/24* (2022.01)
(Continued)

(52) U.S. Cl.
CPC .............. *H04L 69/14* (2013.01); *H04L 45/24* (2013.01); *H04L 67/04* (2013.01); *H04W 40/02* (2013.01); *H04L 45/243* (2022.05)

(58) Field of Classification Search
CPC ..... H04L 45/24; H04L 45/243; H04L 47/193; H04L 47/34; H04L 47/41; H04L 67/04;
(Continued)

(56) References Cited

U.S. PATENT DOCUMENTS

2012/0093150 A1 4/2012 Kini
2016/0309534 A1 10/2016 Teyeb et al.
(Continued)

FOREIGN PATENT DOCUMENTS

CN 104285472 A 1/2015
CN 109644190 A 4/2019
(Continued)

OTHER PUBLICATIONS

Motorola Mobility et al: "Using MPTCP with and without a MA-PDU Session", 3GPP Draft; S2-187862_MPTCP Withes Without MA-PDUes V2, 3rd Generation Partnership Project (3GPP), Mobile Competence Centre;650, Route Des LUCIOLES;F-06921 Sophia-Antipolis Cedex;France vol. SA WG2, No. Sophia Antipolis, France; Aug. 20, 2018-Aug. 24, 2018 Aug. 14, 2018 (Aug. 14, 2018), XP051536821 Retrieved from the Internet: URL:http://www.3gpp.org/ftp/tsg%SFsa/WG2%SFArch/ TSGS2%5F128BIS%5FSophia%5FAntipolis/Docs/S2%2D187862%2Ezip [retrieved on Aug. 14, 2018].
(Continued)

*Primary Examiner* — Lan-Huong Truong

(57) ABSTRACT

This application provides a router. The router includes a processor and a transceiver. The transceiver is configured to receive collaboration information that is sent by a mobile terminal and used for collaboratively establishing a plurality of data transmission channels. The processor is configured to: run a multipath transmission protocol; identify, based on the multipath transmission protocol, the collaboration information received by the transceiver; and send matching information to the mobile terminal. The transceiver is configured to receive and identify matching acknowledgment information sent by the mobile terminal. The processor is configured to establish the plurality of data transmission channels to the mobile terminal based on the successfully identified matching acknowledgment information. The
(Continued)

transceiver is configured to receive data sent by the mobile terminal through the plurality of data transmission channels. The processor is configured to remove redundancy from or aggregate the data to obtain single data.

12 Claims, 8 Drawing Sheets

(51) Int. Cl.
*H04L 67/04* (2022.01)
*H04L 69/14* (2022.01)
*H04W 40/02* (2009.01)
*H04L 45/243* (2022.01)

(58) Field of Classification Search
CPC ....... H04L 67/14; H04L 67/146; H04L 67/55; H04L 67/561; H04L 67/566; H04L 69/14; H04L 45/60; H04L 69/161; H04W 40/02; H04W 28/0865; H04W 28/12; Y02D 30/70
See application file for complete search history.

(56) References Cited

U.S. PATENT DOCUMENTS

2016/0315976 A1* 10/2016 Detal ................. H04L 45/16
2017/0118022 A1 4/2017 Long et al.
2017/0134261 A1* 5/2017 Seo ..................... H04L 45/24
2019/0306068 A1 10/2019 Kiss et al.
2020/0288316 A1* 9/2020 Kanagarathinam ... H04L 69/162

FOREIGN PATENT DOCUMENTS

| CN | 110351186 A | 10/2019 |
|---|---|---|
| IN | 107995624 A | 5/2018 |
| JP | 2006203471 A | 8/2006 |
| WO | 2019062252 A1 | 4/2019 |
| WO | 2020220705 A1 | 11/2020 |

OTHER PUBLICATIONS

Lee Hyunjong et al: "Poster Abstract: Reducing Tail Response Time of Vehicular Applications", 2016 IEEE/ACM Symposium on Edge Computing (SEC), IEEE, Oct. 27, 2016 (Oct. 27, 2016), pp. 103-104, XP033018369, DOI: 10.1109/SEC.2016.31 [retrieved on Dec. 5, 2016].

Zhao Qi et al: "Energy Efficiency Enhancement in 5G Mobile Wireless Networks", 2019 IEEE 20th International Symposium on "A World of Wireless, Mobile and Multimedia Networks" (WOWMOM), IEEE, Jun. 10, 2019 (Jun. 10, 2019), pp. 1-3, XP033594793, DOI: 10.1109/WOWMOM.2019.8792998 [retrieved on Aug. 8, 2019].

Request for Comments: 6897, M. Scharf et al, Multipath TCP (MPTCP) Application Interface Considerations, Internet Engineering Task Force (IETF), Mar. 2013, 31 Pages.

* cited by examiner

MULTIPATH TRANSMISSION METHOD AND DEVICE

This application is a continuation of International Application No. PCT/CN2020/137149 filed on Dec. 17, 2020, which claims priority to Chinese Patent Application No. 201911315074.3 filed with the China National Intellectual Property Administration on Dec. 19, 2019 and entitled "MULTIPATH TRANSMISSION METHOD AND DEVICE", both of which applications are incorporated herein by reference in their entirety.

TECHNICAL FIELD

The present invention relates to the field of communication technologies, and in particular, to a multipath transmission method and a device.

BACKGROUND

Currently, with rapid development of the Internet and progress of broadband access technologies for user equipment (UE) such as mobile phones and notebook computers, one user equipment has a plurality of network interfaces, such as a Wi-Fi (Wireless Fidelity) interface, a 2G (2nd Generation Mobile Communication Technology, second generation mobile communication technology) interface, a 3G (3rd Generation Mobile Communication Technology, third generation mobile communication technology) interface, a 4G (4th Generation Mobile Communication Technology, fourth generation mobile communication technology) interface, and a 5G (5th Generation Mobile Communication Technology, fifth generation mobile communication technology) interface, to implement a plurality of links to a target node. A conventional transmission control protocol (TCP) is a one-to-one transmission protocol, and cannot fully take advantage of multiple access and multiple network interfaces of the user equipment. Consequently, resource waste is caused. Based on this, the IETF (Internet Engineering Task Force) proposes the MPTCP (multipath transmission control protocol). The MPTCP is an improved protocol of the TCP, and allows two communication parties to perform data transmission through a plurality of connections. Currently, a common multipath transmission protocol deployment method includes: A multipath transmission protocol is deployed on a server, and multipath transmission is performed on the server, to ensure that data can be smoothly transmitted in both a cellular network and a Wi-Fi network. Alternatively, a multipath transmission protocol is deployed on a network device node, to combine long term evolution (LTE) and a Wi-Fi network, and increase a bandwidth and a network speed. However, in the current multipath transmission protocol deployment method, a device vendor or an operator needs to deploy the multipath transmission protocol on the server or a base station, resulting in high costs.

SUMMARY

This disclosure provides a multipath transmission method and an apparatus to reduce costs of deploying a multipath transmission protocol. Costs of deploying the multipath transmission protocol are reduced, a communication delay is reduced, and user experience is improved.

The foregoing and other benefits are achieved by method and apparatus as recited in the independent claims. Further implementations are reflected in the dependent claims, the specification, and the accompanying drawings.

A router includes at least one processor and a memory connected to the at least one processor and carrying instructions that, when executed by the at least one processor, cause the router to perform operations to:
receive collaboration information from a mobile terminal to collaboratively establish a plurality of data transmission channels;
run a multipath transmission protocol and identify, based on the multipath transmission protocol, the received collaboration information and send to the mobile terminal matching information corresponding to the collaboration information;
receive and identify matching acknowledgment information sent by the mobile terminal;
establish a plurality of data transmission channels to the mobile terminal based on successful identification of matching acknowledgment information;
receive data sent by the mobile terminal through the plurality of data transmission channels;
remove redundancy from or aggregate the data to obtain single data; and
forward the single data to a destination server.

In a possible implementation, the multipath transmission protocol is an MPTCP protocol.

In a possible implementation, the plurality of data transmission channels are four data transmission channels.

In a possible implementation, the four data transmission channels are two data transmission channels established through a cellular network and two data transmission channels established through a Wi-Fi network.

In a possible implementation, the router is an edge router.

According to a second aspect, a network communications system for multipath transmission is provided that includes a mobile terminal, a router, and a server. The mobile terminal is configured to run an application and to generate data from the application and send the data to the server and to copy or split the data into a plurality of pieces of data and to run a multipath transmission protocol, generate collaboration information, send the collaboration information to the router, and negotiate with the router to establish a plurality of data transmission channels.

The router is configured to run the multipath transmission protocol, receive the collaboration information sent by the mobile terminal, identify the collaboration information, and when the collaboration information is successfully identified, send matching information to the mobile terminal. The mobile terminal is configured to receive and to identify the matching information and to send matching acknowledgment information to the router. The router receives and identifies the matching acknowledgment information, and when the matching acknowledgment information is successfully identified, establish the plurality of data transmission channels to the mobile terminal.

When the matching information is successfully identified, the mobile terminal sends matching acknowledgment information to the router.

The router receives and identifies the matching acknowledgment information, and when the matching acknowledgment information is successfully identified, establishes the plurality of data transmission channels to the mobile terminal.

In a possible implementation, the router is an edge router.

In a possible implementation, the multipath transmission protocol is the MPTCP protocol.

In a possible implementation, the plurality of data transmission channels are four data transmission channels.

In a possible implementation, the four data transmission channels are two data transmission channels established through a cellular network and two data transmission channels established through a Wi-Fi network.

In a possible implementation, the application is an application related to user security or privacy.

According to a third aspect, a MEC server is provided, including:

a processor; and a transceiver.

The transceiver is configured to receive collaboration information that is sent by a mobile terminal and used for collaboratively establishing a plurality of data transmission channels.

The processor is configured to: run a multipath transmission protocol; identify, based on the multipath transmission protocol, the collaboration information received by the transceiver; and send matching information to the mobile terminal.

The transceiver is configured to receive and identify matching acknowledgment information sent by the mobile terminal.

The processor is configured to establish the plurality of data transmission channels to the mobile terminal based on the successfully identified matching acknowledgment information.

The transceiver is configured to receive data sent by the mobile terminal through the plurality of data transmission channels.

The processor is configured to remove redundancy from or aggregate the data to obtain single data.

The transceiver is configured to forward the single data to a destination server of the data.

In a possible manner, the multipath transmission protocol is the MPTCP protocol.

In a possible manner, the plurality of data transmission channels are four data transmission channels.

In a possible manner, the four data transmission channels are two data transmission channels established through a cellular network and two data transmission channels established through a Wi-Fi network.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that one or more embodiments include a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in embodiments may be combined in any proper manner. Persons skilled in the art understands that an embodiment may be implemented without one or more specific technical features, technical solutions, or beneficial effects in a specific embodiment. In other embodiments, additional technical features and beneficial effects may further be identified in a specific embodiment that does not reflect all embodiments.

DESCRIPTION OF EMBODIMENTS

Terms used in the following embodiments are merely intended to describe specific embodiments, but are not intended to limit this application. As used in the specification and appended claims of this application, the terms "a", "one", "the", "the foregoing", "this", and "the one" of singular forms are intended to also include plural forms, for example, "one or more", unless otherwise clearly specified in the context. It should be further understood that in the following embodiments of this application, "at least one" and "one or more" refer to one, two, or more. The term "and/or" is used to describe an association relationship between associated objects, and indicates that there may be three relationships. For example, A and/or B may represent the following cases: Only A exists, both A and B exist, and only B exists, where A and B may be singular or plural. The character "/" generally represents an "or" relationship between the associated objects.

Reference to "an embodiment", "some embodiments", or the like described in this specification means that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment. Instead, the statements mean "one or more but not all of the embodiments", unless otherwise specifically emphasized in another manner. The terms "include", "contain", "have", and their variants all mean "include but are not limited to", unless otherwise specifically emphasized.

Embodiments of this application disclose a multipath transmission method and a device, to resolve a problem of high costs of deploying a multipath transmission protocol currently, and reduce a communication delay. The multipath transmission protocol is used by a router and a mobile terminal in collaboration, so that a third-party server is not required, and a problem of a security risk in accessing a network in a public place can be resolved. Deploying the multipath transmission protocol on a local router is more cost-effective than deploying the multipath transmission protocol on a node of a server or a network device. Detailed descriptions are separately provided below.

Figure 1:
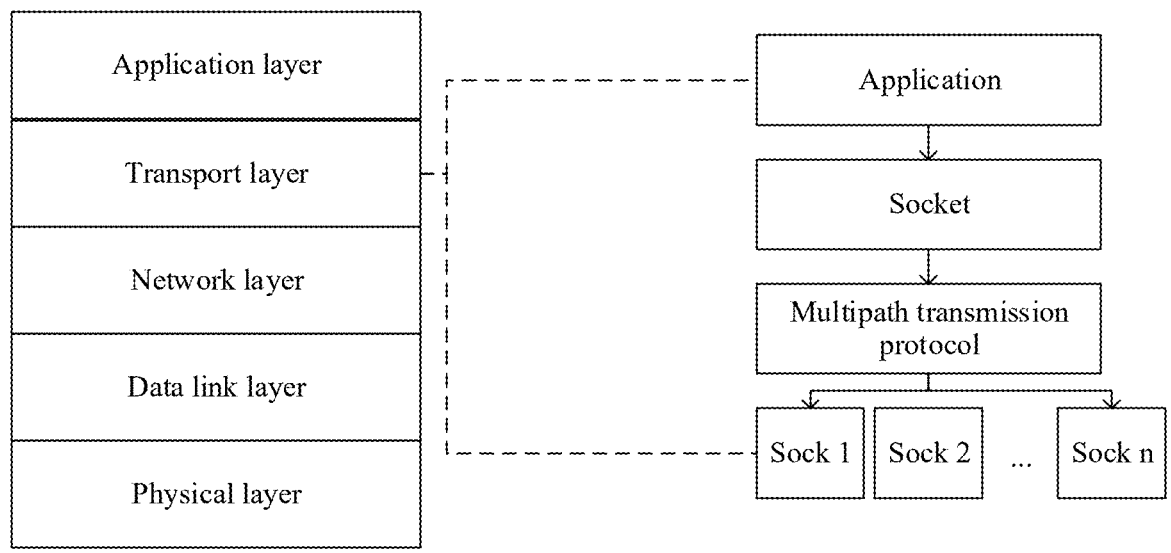
FIG. 1 is a schematic diagram of a principle of a multipath transmission protocol according to an embodiment of this application.

This application provides an embodiment. As shown in FIG. 1, a multipath transmission protocol is located at a transport layer of a network protocol stack. The network protocol stack, also referred to as a protocol stack, is a specific software implementation of a computer network protocol suite. The network protocol stack includes an application layer, the transport layer, a network layer, a data link layer, and a physical layer. The multipath transmission protocol is a protocol at the transport layer. A transmit end on which the multipath transmission protocol is deployed allows establishment of a plurality of sub-channels in one transmission control protocol (TCP) link. After a channel is established in a three-way handshake manner of the TCP protocol, another sub-channel may be established in the three-way handshake manner. These channels are established in the three-way handshake manner and released in a four-way handshake manner. All the channels are bound to a multipath transmission session (session), and an upper-layer application (application) may select one of the plurality of established channels for transmission. Establishment of a first sub-channel of the multipath transmission protocol complies with the TCP three-way handshake. In addition, an identifier for establishing multipath transmission, for example, "MP_CAPABLE", and a key for a security purpose are added to a packet segment to be sent each time. Three-way handshake needs to be performed to establish another sub-channel. Each time the packet segment is sent, the identifier for establishing multipath transmission is replaced with an identifier for joining multipath transmission, for example, "MP_JOIN", and a token is generated based on a key value, to identify the sub-channel. The multipath transmission protocol is used to divide data that needs to be sent into a plurality of parts, and transmit the data through the established sub-channels. Each sub-channel is an independent end-to-end session. A receive end on which the multipath transmission protocol is deployed may aggregate the foregoing received data into single data. This transmission mechanism is not transparent to the upper-layer application. The upper-layer application may add or delete an address in a link pool through an application programming interface (API), but cannot directly manage or operate data transmission channels of the multipath transmission protocol. The multipath transmission protocol ensures that a lower-layer TCP component is not affected.

A specific procedure of establishing the sub-channel in the link by using the multipath transmission protocol is: The transmit end sends an SYN message to the receive end, where a field of the multipath transmission protocol includes an identifier for establishing the sub-channel. If the receive end also supports the same multipath transmission protocol, the receive end returns a SYN+ACK response, where the identifier for establishing the sub-channel is included in the same field. A session between the transmit end and the receive end uses the ACK and the identifier for establishing the sub-channel to complete a handshake process, to ensure that both ends obtain session data of each other. In the session process, both ends exchange a 64-bit session key and separately generate a 32-bit hash shared key. For example, the mobile terminal uses both a wireless fidelity (Wi-Fi) network and a 4G cellular network to establish a multipath transmission session to the server. The mobile terminal sends a SYN data packet to the server through the 4G cellular network. The SYN data packet carries an MP_CAPABLE field and a key, where the field indicates that the mobile terminal supports the multi-path transmission protocol. A SYN+ACK packet returned by the server also carries the MP_CAPABLE field and a key. The mobile terminal returns an ACK again. In this case, a data transmission channel is established between the mobile terminal and the server. The mobile terminal sends a SYN data packet through the Wi-Fi network. The SYN data packet carries an MP_JOIN field indicating that the mobile terminal needs to establish a sub-channel. In addition, a token is carried, and the token is a hash value of the key. The SYN data packet further carries a rand field, and rand is a random number. A SYN+ACK data packet returned by the server carries the rand field and an HMAC field, and HMAC is a hash value of rand. The mobile terminal returns an ACK data packet again, carrying the HMAC field. The server returns an ACK data packet. In this case, a four-way handshake between the mobile terminal and the server is completed, and a sub-channel connection is established.

It may be understood that, when the transmit end runs the multipath transmission protocol, collaboration information is generated, and the collaboration information is used to negotiate with the receive end to establish a plurality of data transmission channels. The transmit end sends the collaboration information to the receive end, and the receive end receives the collaboration information. The receive end runs the multipath transmission protocol, identifies the received collaboration information, and if the identification succeeds, sends matching information to the transmit end. The transmit end receives the matching information, performs matching based on the matching information, and if the matching succeeds, sends matching acknowledgment information to the receive end. After receiving the matching acknowledgment information, the receive end establishes the plurality of data transmission channels.

When the transmit end uses the multipath transmission protocol to transmit data, the following modes are used: (1) Multipath redundancy multi-sending: To be specific, the transmit end copies, based on the multipath transmission protocol, a same data packet that needs to be transmitted, and then sends the data packets to the receive end in parallel through a plurality of data transmission channels. The receive end performs data packet aggregation based on sequence numbers of data packets sent from different data transmission channels. If there are data packets with a same sequence number from different data transmission channels, one data packet is left and the remaining data packets with a same sequence number are discarded. If sequence numbers are different, data packets with the different sequence numbers are aggregated. (2) Packet compensation upon packet loss: To be specific, when the transmit end identifies that a data packet fails to be sent, a sub-channel needs to be added by using the multipath transmission protocol to supplement and send lost data of the data packet. The receive end receives the data packet supplemented and sent by the transmit end, and aggregates the supplemented and sent data packet with the initially sent data packet. (3) A special packet is redundantly sent: The transmit end copies a key packet. When the data packet is sent in the foregoing manner (1) or (2), the transmit end further performs supplementary sending through a sub-data transmission channel established by using the multipath transmission protocol. A supplemented and sent data packet and the data packet sent in the foregoing manner (1) or (2) are sent to the receive end in parallel. The receive end performs data packet aggregation based on sequence numbers of data packets sent from different data transmission channels. If there are data packets with a same sequence number from different data transmission channels, one data packet is left and the remaining data packets with a same sequence number are discarded. If sequence numbers are different, data packets with the different sequence numbers are aggregated.

The multipath transmission protocol uses the four-way handshake to ensure connection security and may provide reliable transmission. Use of the multipath transmission protocol can avoid disconnection and reconnection, and fully take advantage of network resources. For example, even if there is no Wi-Fi connection, data transmission can continue to be performed through the cellular network.

Figure 2A:
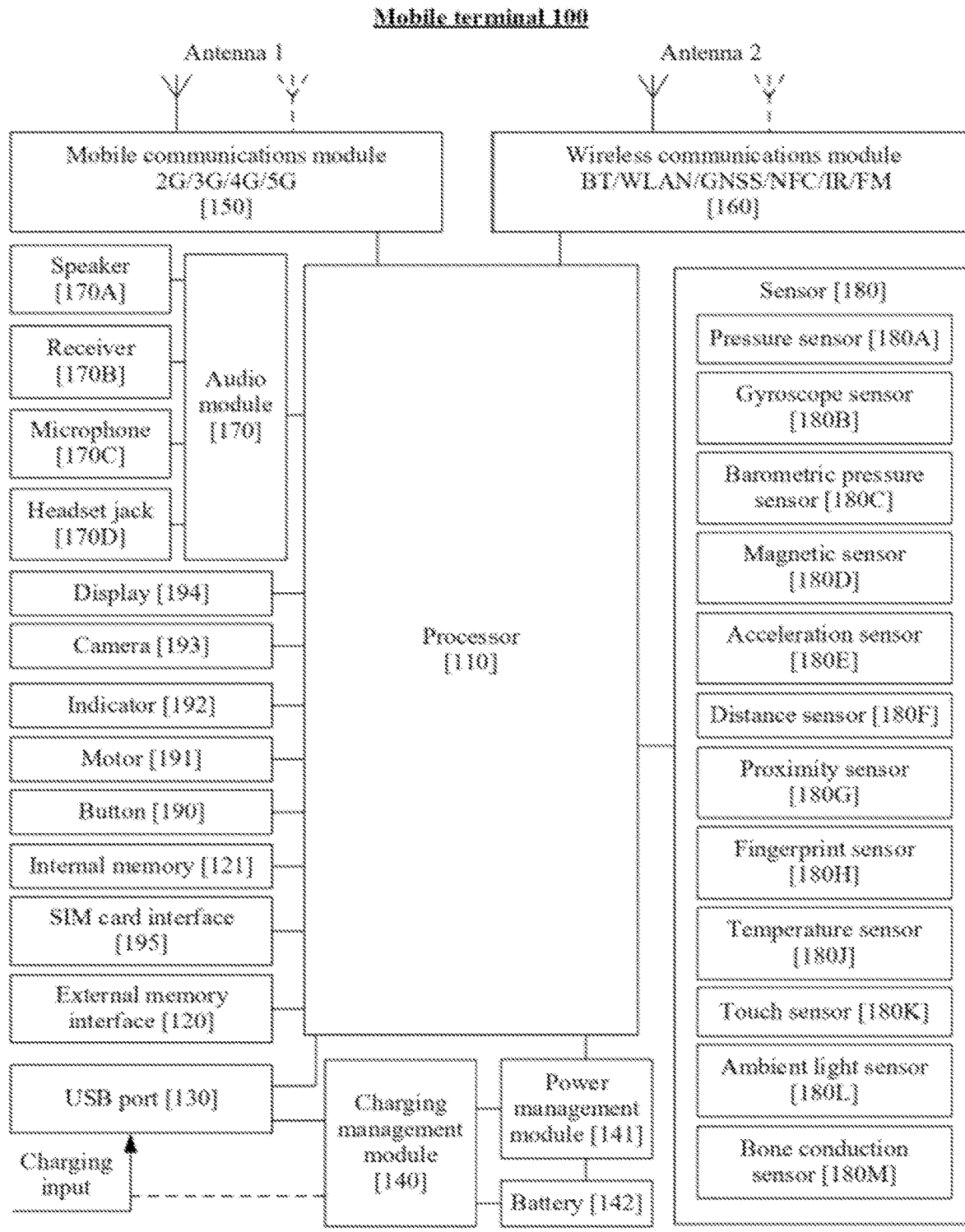
FIG. 2A is a schematic diagram of a hardware structure of a mobile terminal according to an embodiment of this application.

This application further provides an embodiment. FIG. 2A is a schematic diagram of a structure of a mobile terminal 100. As shown in FIG. 2A, the mobile terminal 100 may include a processor 110, an external memory interface 120, an internal memory 121, a USB port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset interface 170D, one or more sensors 180, a button 190, a motor 191, an indicator 192, a camera 193, a display 194, a subscriber identification module (SIM) card interface 195, and the like. It may be understood that the structure shown in this embodiment constitutes no specific limitation on the mobile terminal 100. In some other embodiments, the mobile terminal 100 may include more or fewer components than those shown in the figure, or some components may be combined, or some components may be split, or there may be a different component arrangement. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. In some embodiments, the mobile terminal 100 may alternatively include one or more processors 110. The controller may generate an operation control signal based on instruction operation code and a time sequence signal, to complete control of instruction fetching and instruction execution. In some other embodiments, a memory may further be disposed in the processor 110, to store instructions and data. For example, the memory in the processor 110 may be a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving data processing or instruction execution efficiency of the mobile terminal 100. The memory may store code of a multipath transmission protocol. The processor 110 may run a proxy module. The proxy module may manage a data stream generated by an application, determine whether to copy or split a data packet, and may further perform aggregation or redundancy removal processing on the data packet.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a universal serial bus (USB) interface, and/or the like. The USB port 130 is a port that conforms to a USB standard specification, and may be specifically a mini USB port, a micro USB port, a USB type-C port, or the like. The USB port 130 may be configured to connect to a charger to charge the mobile terminal 100, and may be configured to transmit data between the mobile terminal 100 and a peripheral device. The USB port 130 may also be configured to connect to a headset, and play audio through the headset.

It may be understood that an interface connection relationship between the components illustrated in this embodiment is merely an example for description, and does not constitute a limitation on the structure of the mobile terminal 100. In some other embodiments, the mobile terminal 100 may alternatively use an interface connection manner different from that in the foregoing embodiment or use a combination of a plurality of interface connection manners.

A wireless communication function of the mobile terminal 100 may be implemented by using the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the mobile terminal 100 may be configured to cover one or more communication frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution, applied to the mobile terminal 100, for wireless communication including 2G, 3G, 4G, 5G, and the like. The mobile communications module 150 may include one or more filters, a switch, a power amplifier, a low noise amplifier, and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a solution, applied to the mobile terminal 100, to wireless communication including a wireless local area network (wireless LAN, WLAN), Bluetooth, a global navigation satellite system (global navigation satellite system, GNSS), frequency modulation (frequency modulation, FM), NFC, an infrared (infrared, IR) technology, and the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the mobile terminal 100, the antenna 1 is coupled to the mobile communications module 150, and the antenna 2 is coupled to the wireless communications module 160, so that the mobile terminal 100 can communicate with a cellular network and another electronic device by using a wireless communications technology. The wireless communications technology may include a global system for mobile communications (GSM), a general packet radio service (GPRS), code division multiple access (CDMA), wideband code division multiple access (WCDMA), time division-synchronous code division multiple access (TD-SCDMA), LTE, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile terminal 100 may implement a display function by using the GPU, the display 194, the AP, and the like. The GPU is a microprocessor for image processing, and is connected to the display 194 and the AP. The GPU is configured to perform mathematical and geometric calculation, and render an image. The processor 110 may include one or more GPUs, which execute instructions to generate or change display information. The mobile terminal 100 may implement a photographing function through the ISP, one or more cameras 193, the video codec, the GPU, one or more displays 194, the AP, and the like.

The external memory interface 120 may be configured to connect to an external storage card such as a micro SD card, to extend a storage capability of the mobile terminal 100. The external storage card communicates with the processor 110 through the external memory interface 120, to implement a data storage function. For example, data files such as music, photos, and videos are stored in the external storage card.

The internal memory 121 may be configured to store one or more computer programs, and the one or more computer programs include instructions. The internal memory 121 may store a protocol stack of the multipath transmission protocol. The processor 110 may run the instructions stored in the internal memory 121, to enable the mobile terminal 100 to perform a multipath transmission protocol-based data transmission method provided in some embodiments of this application, various applications, data processing, and the like. For example, the internal memory 121 may include a program storage area and a data storage area. The program storage area may store an operating system. The program storage area may further store one or more applications (such as "Gallery" and "Contacts"), and the like. The data storage area may store data (such as photos and contacts) created during the use of the mobile terminal 100, and the like. In addition, the internal memory 121 may include a high-speed random access memory, or may include a non-volatile memory, for example, one or more magnetic disk storage devices, a flash memory device, or a universal flash storage (universal flash storage, UFS). In some embodiments, the processor 110 may run the instructions stored in the internal memory 121 and/or the instructions stored in the memory disposed in the processor 110, to enable the mobile terminal 100 to perform the multipath transmission protocol-based data transmission method provided in embodiments of this application, other applications, and data processing.

The mobile terminal 100 may implement an audio function, for example, music playing and recording, through the audio module 170, the speaker 170A, the receiver 170B, the microphone 170C, the headset jack 170D, the AP, and the like.

The sensor 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like. The touch sensor 180K may also be referred to as a touch panel or a touch-sensitive surface. The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the AP, to determine a type of a touch event. A visual output related to the touch operation may be provided on the display 194. In some other embodiments, the touch sensor 180K may alternatively be disposed on a surface of the mobile terminal 100 at a location different from that of the display 194.

The SIM card interface 195 is configured to connect to a SIM card. The SIM card may be inserted into the SIM card interface 195 or removed from the SIM card interface 195, to implement contact with or separation from the mobile terminal 100. The mobile terminal 100 may support one or more SIM card interfaces. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The mobile terminal 100 interacts with a network by using the SIM card, to implement functions such as calling and data communication. In some embodiments, the mobile terminal 100 uses an eSIM, namely, an embedded SIM card. The eSIM card may be embedded in the mobile terminal 100, and cannot be separated from the mobile terminal 100.

In some embodiments, the wireless communications module 160 may be specifically configured to establish a short-range wireless communication link with another electronic device, so that the wireless communications module 160 and the another electronic device perform short-range wireless data transmission with each other. For example, the short-range wireless communication link may be a Bluetooth link, a Wi-Fi link, an NFC link, or the like. Therefore, the wireless communications module 160 may specifically include a Bluetooth communications module, a Wi-Fi communications module, or an NFC communications module.

Figure 2B:
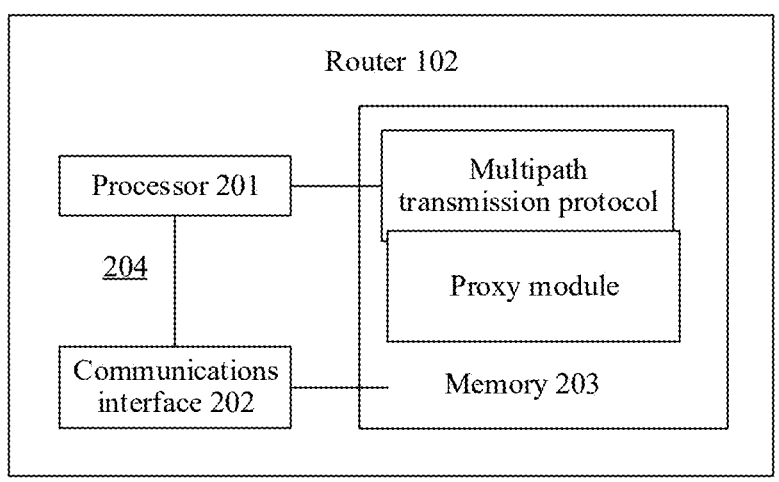
FIG. 2B is a schematic diagram of a structure of a router according to an embodiment of this application.

This application further provides an embodiment. FIG. 2B shows a router 102 on which a multipath transmission protocol is deployed. The router 102 may include components such as at least one processor 201, for example, a central processing unit (central processing unit, CPU), at least one communications interface 202, and a memory 203. These components may perform communication and connection through one or more communications buses 204. A person skilled in the art may understand that the structure of the router 102 shown in FIG. 2 does not constitute a limitation on this embodiment of this application. The structure may be a bus structure or a star structure, and more or fewer components than those shown in the figure may alternatively be included, or some components may be combined, or there may be a different component arrangement. The communications interface 202 may include a wired interface, a wireless interface, and the like. The memory 203 may be a random access memory (random access memory, RAM), or a non-volatile memory (non-volatile memory), for example, at least one magnetic disk memory. The memory 203 stores the multipath transmission protocol. The processor 201 may invoke the multipath transmission protocol from the memory 203, and may further perform routing and forwarding functions.

Figure 3:
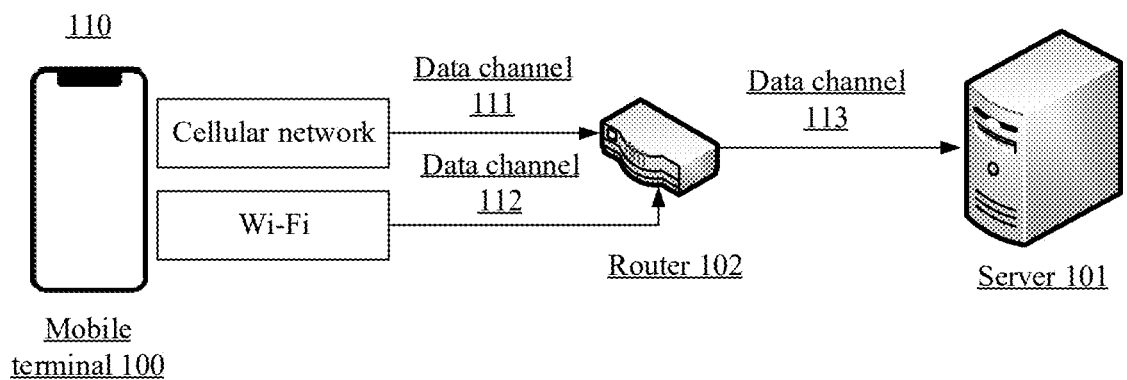
FIG. 3 is a schematic diagram of a network architecture for transmitting data by using a multipath transmission protocol according to an embodiment of this application.

In some embodiments, for example, as shown in FIG. 3, a network architecture 110 includes a mobile terminal 100, a router 102, and a server 101. A multipath transmission protocol may be deployed on the mobile terminal 100. The multipath transmission protocol may be the multipath TCP (multipath TCP, MPTCP) protocol or another multipath transmission protocol. The mobile terminal 100 may split or copy, by using a proxy module, data generated by an application (application, APP) running on the mobile terminal, and transmit the data to the router 102 through a plurality of paths according to the multi-path transmission protocol. For example, the data generated by the APP may be transmitted on a data transmission channel 111 between the mobile terminal 100 and the router 102 through a cellular network, and the data transmission channel 111 is a data transmission channel or a sub-data transmission channel established by the mobile terminal 100 by using the multipath transmission protocol. In addition, the data may be simultaneously transmitted on a data transmission channel 112 between the mobile terminal 100 and the router 102 through a Wi-Fi network, and the data transmission channel 112 is a data transmission channel or a sub-data transmission channel established by the mobile terminal 100 by using the multipath transmission protocol. The same multipath transmission protocol as that on the mobile terminal 100 is also deployed on the router 102. The router 102 aggregates or removes redundancy from the plurality of pieces of data transmitted by the mobile terminal 100 through the data transmission channel 111 and the data transmission channel 112, to convert the plurality of pieces of transmitted data into one piece of data, and forwards the one piece of data to the server 101 through a data transmission channel 113. The data transmission channel 113 may be a data transmission channel established by using the TCP protocol or a data transmission channel established by using the user datagram protocol (user datagram protocol, UDP). The server 101 may be an application server, and a user communicates with the application installed on the mobile terminal 100 (for example, a mobile phone) through one or more communications networks. It may be understood that, data generated by the server 101 may be sent to the router 102 through a data transmission channel established by using the TCP protocol or the UDP protocol, and after being copied or split by a proxy module of the router 102, the data is forwarded to a plurality of socks and ports established through negotiation, and is sent to the mobile terminal 100 through different network channels. After receiving the data, the mobile terminal 100 aggregates or removes redundancy from the received data by using the proxy module, and forwards processed single sock data to an upper-layer application.

Figure 4:
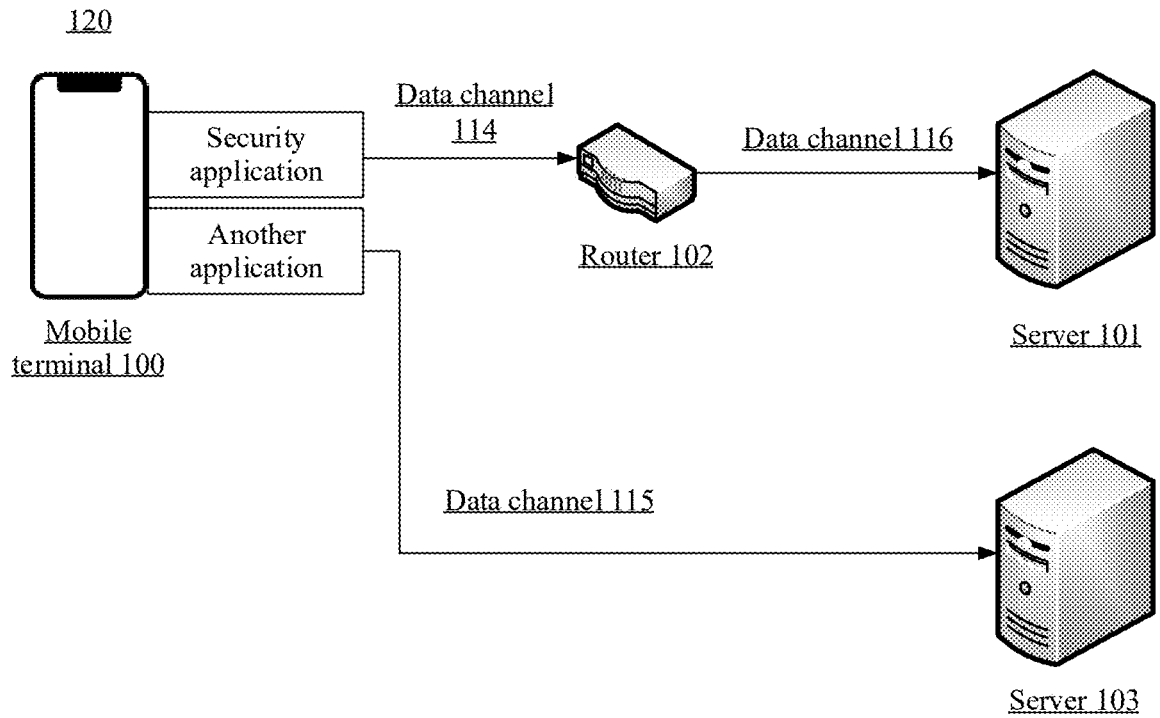
FIG. 4 is a schematic diagram of a network architecture in which a security application transmits data by using a multipath transmission protocol according to an embodiment of this application.

In some other embodiments, for example, a network architecture 120 shown in FIG. 4 includes a mobile terminal 100, a router 102, a server 101, and a server 103. A multipath transmission protocol may be deployed on the mobile terminal 100. The multipath transmission protocol may be the multipath TCP (MPTCP) protocol or another multipath transmission protocol. The mobile terminal 100 may split or copy, by using a proxy module, data generated by an application (APP) running on the mobile terminal, and transmit the data to the router 102 through a plurality of paths according to the multi-path transmission protocol. An application related to security (for example, an online payment application), an application related to privacy (for example, an application related to a private photo or a private file), and another application not related to security or privacy run on the mobile terminal 100. A data transmission channel 114 may be used to transmit data of the application related to security or privacy. The data transmission channel 114 is a data transmission channel established between the mobile terminal 100 and the router 102 by using the multipath transmission protocol. A data transmission channel 115 is used to transmit data of the another application not related to security or privacy. The data transmission channel 115 is a data transmission channel established between the mobile terminal 100 and the server 103 by using the TCP protocol or the UDP protocol. The router 102 may be a local router. When the mobile terminal 100 is connected to a public hotspot, data that is related to security or privacy and that is sent by the mobile terminal 100 may be sent to a third-party server, and there is a risk of information leakage. In the embodiments, the mobile terminal 100 sends the data of the application related to security or privacy to the local router 102 through the data transmission channel 114 established by using the multipath transmission protocol, instead of sending the data to the third-party server. Then, the local router 102 sends the data related to security or privacy to the application server 101 through a data transmission channel 116 established by using the TCP protocol or the UDP protocol. This can effectively protect security and privacy of a user, implement secure Wi-Fi access in a public place, and resolve a problem that there is a security risk in Wi-Fi in the public place. It may be understood that, data that is related to security or privacy information and generated by the server 101 may be sent to the router 102 through a data transmission channel established by using the TCP protocol or the UDP protocol, and after being copied or split by a proxy module of the router 102, the data is forwarded to a plurality of socks and ports established through negotiation, and is sent to the mobile terminal 100 through different network channels. After receiving the data, the mobile terminal 100 aggregates or removes redundancy from the received data by using the proxy module, and forwards processed single sock data to an upper-layer application.

Figure 5:
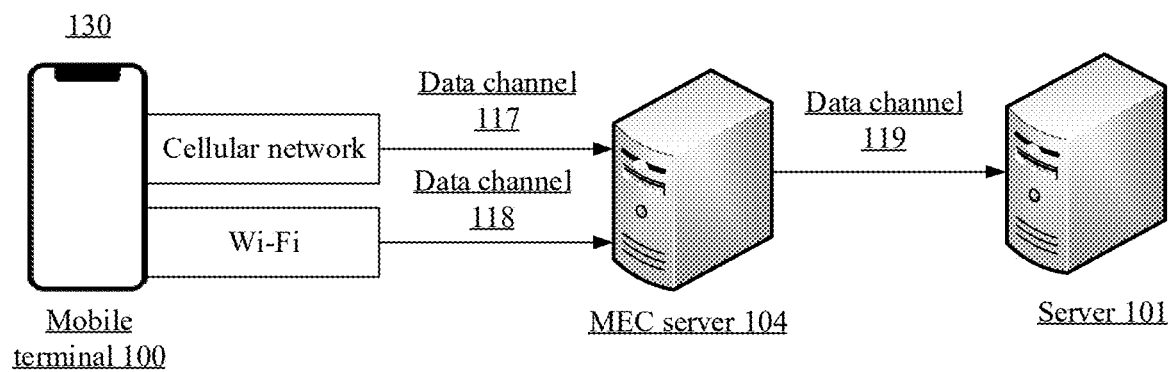
FIG. 5 is a schematic diagram of a network architecture for transmitting data by using a multipath transmission protocol deployed on a MEC server according to an embodiment of this application.

In some embodiments, for example, a network architecture 130 shown in FIG. 5 includes a mobile terminal 100, a mobile edge computing (mobile edge computing, MEC) server 104, and a server 101. The server 101 may be an application server. Mobile edge computing is a network architecture concept defined by European Telecommunications Standards Institute (ETSI), and can implement a cloud computing function and an information technology (IT) service environment at an edge of a cellular network. The MEC server 104 is deployed on a part of base stations in the cellular network, and can provide computing resources, storage capacity, connectivity, and access to radio access network (RAN) information. The MEC server 104 may be a node in a 5G network. A multipath transmission protocol is deployed on the MEC server 104, and the MEC server 104 supports access of the mobile terminal through a Wi-Fi network. The mobile terminal 100 may deploy the multipath transmission protocol. For a specific application having a high network delay requirement, for example, a video voice call, a real-time game, or a live broadcast, a data packet of the specific application is selected, and multipath transmission is performed on the data packet by using the multipath transmission protocol. The mobile terminal 100 may split or copy, by using a proxy module, data generated by an application (application, APP) running on the mobile terminal, and transmit the data to the router 102 through a plurality of paths according to the multi-path transmission protocol. The mobile terminal 100 may establish a cellular network-based data transmission channel 117 and a Wi-Fi network-based data transmission channel 118 to the MEC server 104 by using the multipath transmission protocol. The mobile terminal 100 sends the data packet of the specific application to the MEC server 104 through the data transmission channel 117 and the data transmission channel 118 in parallel. After receiving data packets sent through different data transmission channels, the MEC server 104 leaves only one data packet with a same sequence number and discards the remaining data packets with the same sequence number by using the multipath transmission protocol, aggregates data packets with different sequence numbers, and sends an aggregated data packet through a data transmission channel 119 that is established between the MEC server 104 and the server 101 by using the TCP protocol or the UDP protocol. The mobile terminal 100 may further establish, by using the multipath transmission protocol, a sub-channel for supplementary sending of a special packet of the specific application, to achieve an effect that an entire data link is stable without a packet loss. In the embodiments, the mobile terminal 100 and the MEC server 104 collaboratively use the multipath transmission protocol to transmit data, and compared with that in the embodiments shown in FIG. 3, data transmission is performed without passing through a core network, thereby reducing a delay. In addition, in the embodiments, the mobile terminal 100 and the MEC server 104 collaboratively use the multipath transmission protocol to transmit data, so that a third-party server is not required, and therefore data transmission is more secure. It may be understood that, data generated by the server 101 may be sent to the MEC server 104 through a data transmission channel established by using the TCP protocol or the UDP protocol, and after being copied or split by a proxy module of the MEC server 104, the data is forwarded to a plurality of socks and ports established through negotiation, and is sent to the mobile terminal 100 through different network channels. After receiving the data, the mobile terminal 100 aggregates or removes redundancy from the received data by using the proxy module, and forwards processed single sock data to an upper-layer application.

Figure 6:
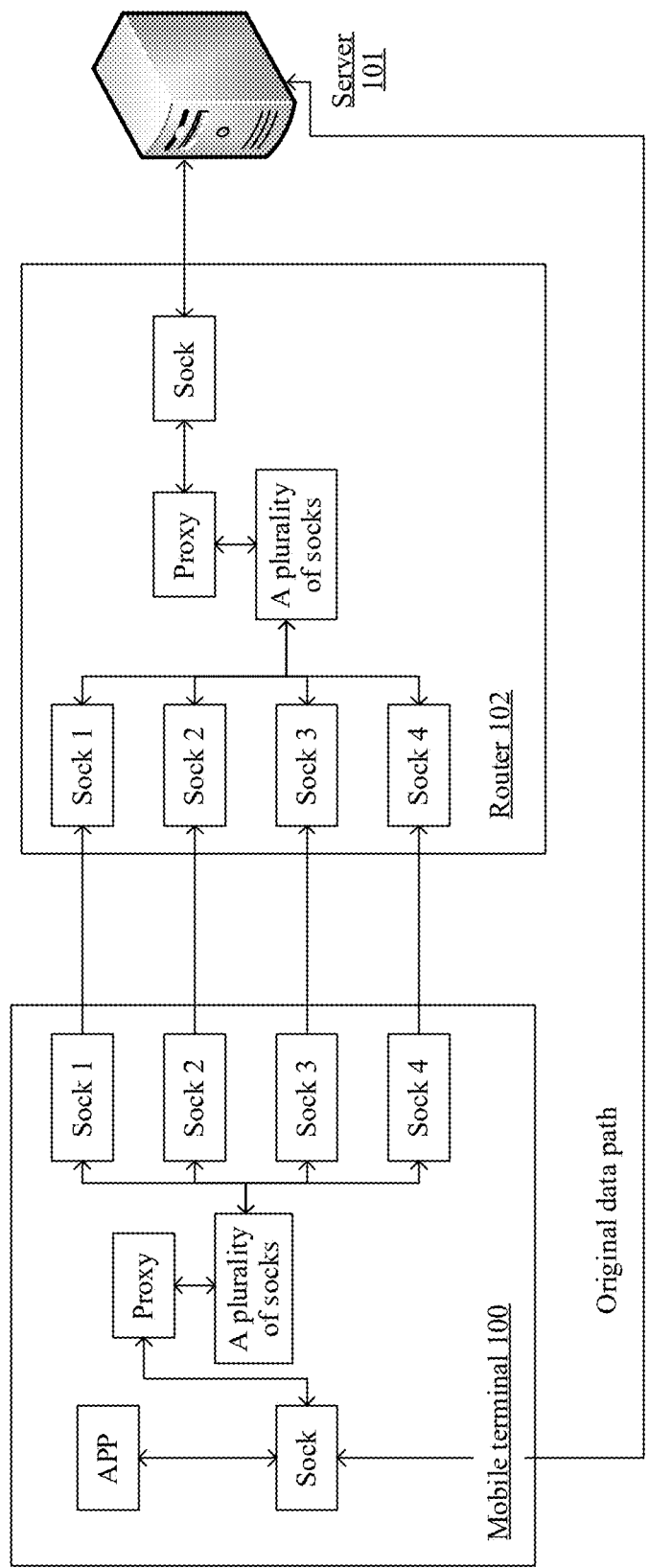
FIG. 6 is a schematic flowchart of transmitting data by using a multipath transmission protocol according to an embodiment of this application.

In some embodiments, FIG. 6 shows a difference between transmitting data by using a multipath transmission protocol and transmitting data without using the multipath transmission protocol by a mobile terminal 100. In the embodiments, the mobile terminal 100, a router 102, and a server 101 are included. The multipath transmission protocol and a proxy (proxy) module are deployed on the mobile terminal 100, and the same multipath transmission protocol and proxy module are deployed on the router 102. The server 101 may be an application server. The mobile terminal 100 sends data generated by an APP to the target application server 101, and may establish a socket according to the TCP protocol, and use an original data path, namely, a single data transmission channel, for data transmission. The mobile terminal 100 may negotiate with the router 102 based on a currently available network channel to establish a plurality of socks and ports. The proxy module processes socket information generated by the APP, and copies and forwards the socket information to the plurality of socks and ports established through negotiation, for example, a sock 1, a sock 2, a sock 3, and a sock 4. If the mobile terminal 100 supports use of dual cellular networks and dual Wi-Fi networks, the four socks may be separately sent on different data transmission channels through different networks. The router 102 receives data packets sent through a plurality of data transmission channel from the mobile terminal side. The proxy module aggregates and removes redundancy from the data packets based on the data packets and the ports to form a single sock, and forwards the single sock to the server 101 through the single data transmission channel established between the router 102 and the server 101. It may be understood that, data generated by the server 101 may be sent to the router 102 through a data transmission channel established by using the TCP protocol or the UDP protocol, and after being copied or split by the proxy module of the router 102, the data is forwarded to the plurality of socks and ports established through negotiation, and is sent to the mobile terminal 100 through different network channels. After receiving the data, the mobile terminal 100 aggregates or removes redundancy from the received data by using the proxy module, and forwards processed single sock data to an upper-layer application.

Figure 7:
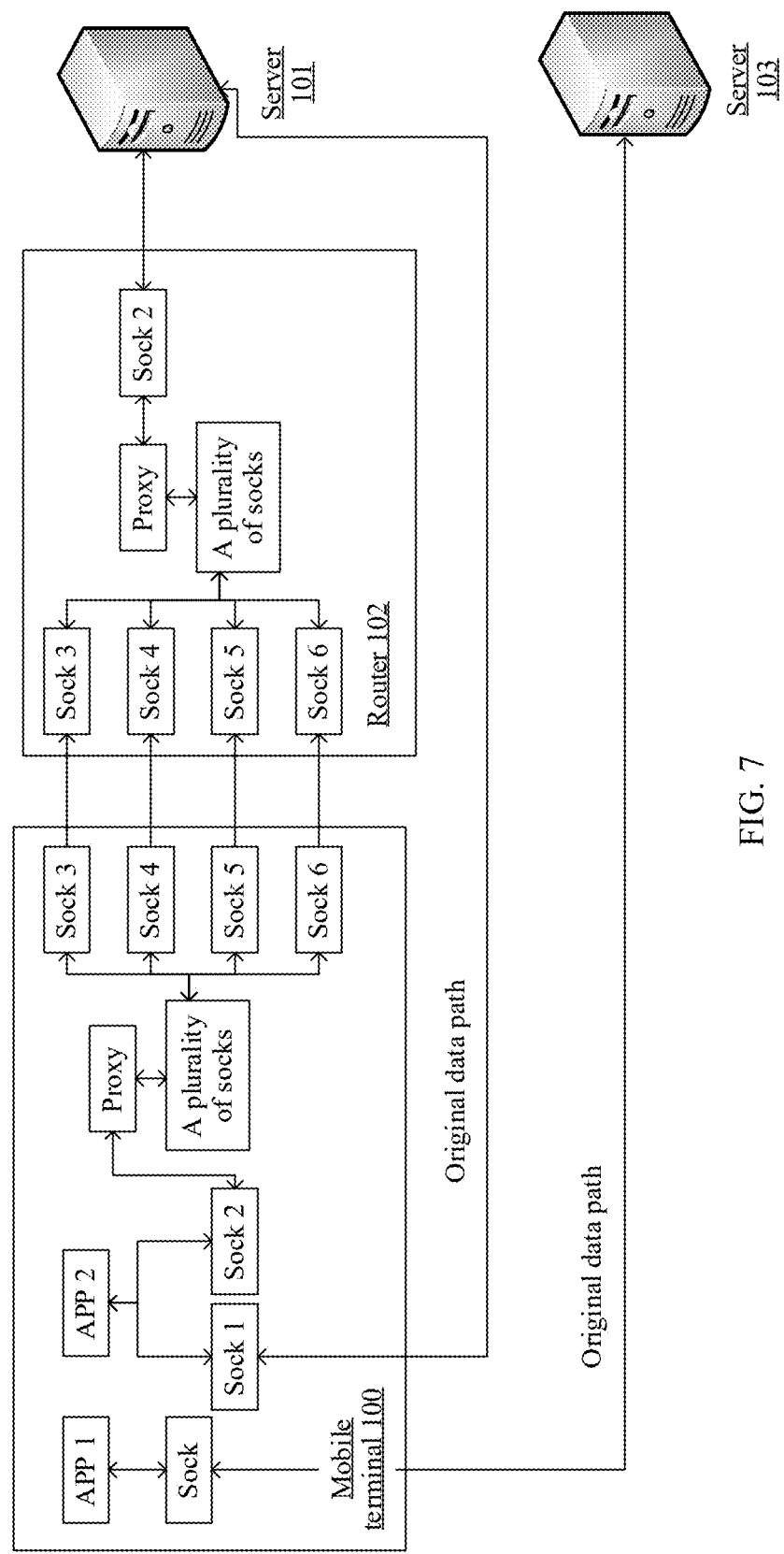
FIG. 7 is a schematic flowchart in which a security application transmits data by using a multipath transmission protocol according to an embodiment of this application.

In some embodiments, as shown in FIG. 7, a mobile terminal determines, based on an upper-layer service requirement and a scenario, whether a multipath transmission protocol is required for data transmission. In this scenario, a mobile terminal 100, applications APP 1 and APP 2 installed on the mobile terminal 100, a router 102, an application server 101 of the APP 1, and an application server 103 of the APP 2 are included. The multipath transmission protocol and a proxy module are deployed on the mobile terminal 100, and the same multipath transmission protocol and proxy module are also deployed on the router 102. The mobile terminal 100 and the router 102 may collaboratively establish a plurality of socks and ports for data transmission. For example, in a scenario in which a security application needs to be used when the mobile terminal is connected to a public hotspot, because the APP 1 installed on the mobile terminal 100 is not a security application, data is transmitted to the application server 103 through a single data transmission channel established by using the TCP protocol. The APP 2 is a security application, data sock 1 that is not related to security information is transmitted through the single data transmission channel established by using the TCP protocol, and data sock 2 that is related to security information such as payment is processed by the proxy module and transmitted to the router 102 by using the plurality of socks and ports that are established in collaboration with the router 102 by using the multipath transmission protocol. After the router 102 receives the data transmitted by using the plurality of socks, the proxy module of the router 102 aggregates and removes redundancy from data packets to form a single sock 2, and sends the single sock 2 to the application server 101 through a single data transmission channel established between the router 102 and the application server 101 by using the TCP protocol. It may be understood that, data that is related to security information and generated by the server 101 may be sent to the router 102 through a data transmission channel established by using the TCP protocol or the UDP protocol, and after being copied or split by the proxy module of the router 102, the data is forwarded to the plurality of socks and ports established through negotiation, and is sent to the mobile terminal 100 through different network channels. After receiving the data, the mobile terminal 100 aggregates or removes redundancy from the received data by using the proxy module, and forwards processed single sock data to the security application APP 2.

Figure 8A:
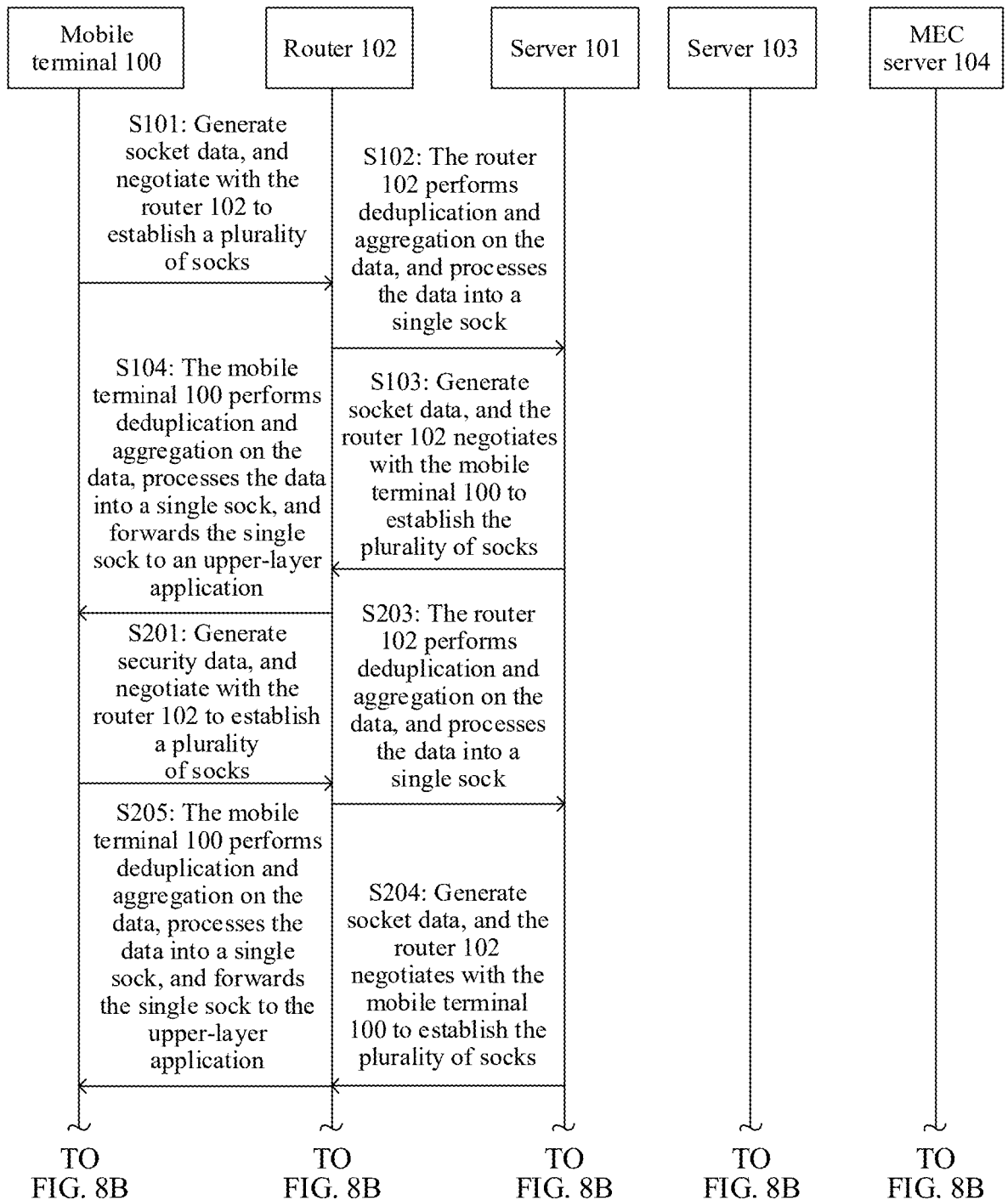
FIG. 8A and FIG. 8B are a schematic diagram of a method for transmitting data by using a multipath transmission protocol according to an embodiment of this application.
Figure 8B:
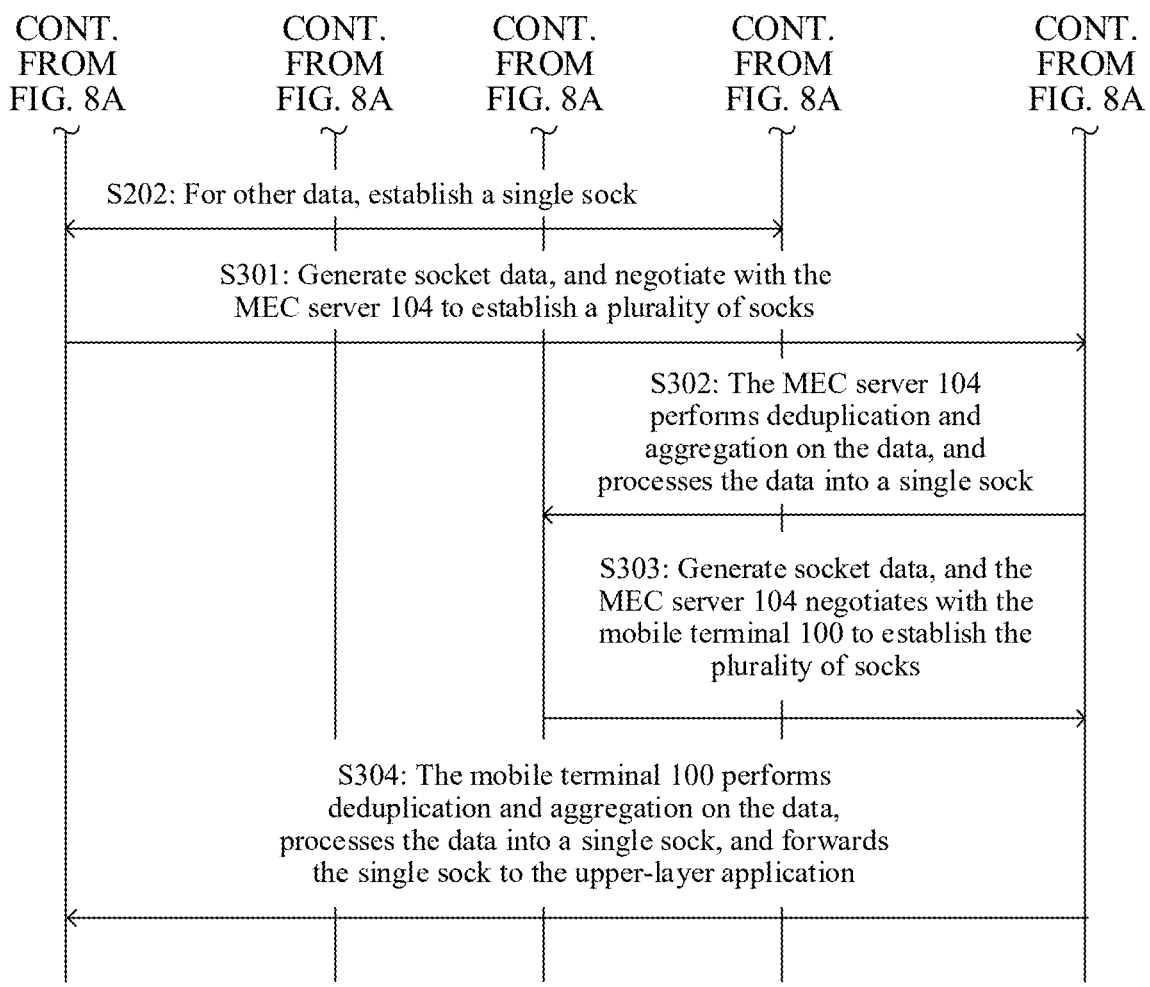

In some embodiments, a multipath transmission method is provided. As shown in FIG. 8A and FIG. 8B, a mobile terminal 100, a router 102, a server 101, a server 103, and an MEC server 104 are included. A multipath transmission protocol and a proxy module are deployed on the mobile terminal 100, the same multipath transmission protocol and proxy module are deployed on the MEC server 104, and the same multipath transmission protocol and proxy module are deployed on the router 102. The router 102 may be a local router.

Step S101: An upper-layer application of the mobile terminal 100 generates sock data; the mobile terminal 100 negotiates with the router 102 based on a currently available network channel, for example, a cellular network or a Wi-Fi network, to establish a plurality of socks and ports; and the proxy module processes sock information generated by the application, copies or splits and forwards the sock information to the plurality of socks and ports established through negotiation, and sends the data to the router 102 through different network channels.

Step S102: The router 102 receives a plurality of pieces of sock data sent by the mobile terminal 100, and the router 102 aggregates or removes redundancy from the plurality of pieces of sock data through the proxy module based on the plurality of socks and ports established through negotiation, and forwards processed single sock data to the original destination server 101 through a data transmission channel established by using the TCP protocol or the UDP protocol.

Step S103: The server 101 generates sock data, and sends the sock data to the router 102 through the data transmission channel established by using the TCP protocol or the UDP protocol; and the proxy module of the router 102 processes the sock data generated by the server, copies or splits the sock data, forwards the sock data to the plurality of socks and ports established through negotiation, and sends the data to the mobile terminal 100 through different network channels.

Step S104: The mobile terminal 100 receives a plurality of pieces of sock data sent by the router 102, and the mobile terminal 100 aggregates or removes redundancy from the plurality of pieces of sock data through the proxy module based on the plurality of socks and ports established through negotiation, and forwards processed single sock data to the upper-layer application.

In some other embodiments, in a scenario in which the mobile terminal 100 is connected to a public hotspot and uses a security application, the method may further include the following steps.

Step S201: The security application of the mobile terminal 100 generates sock data; the mobile terminal 100 negotiates with the router 102 based on a currently available network channel, for example, the cellular network or the Wi-Fi network, to establish a plurality of socks and ports; and the proxy module processes sock information generated by the application, copies or splits and forwards the sock information to the plurality of socks and ports established through negotiation, and sends the data to the router 102 through different network channels.

Step S202: A non-security application of the mobile terminal 100 generates sock data, and the mobile terminal 100 establishes a single data transmission channel to the server 103 by using the TCP protocol or the UDP protocol, where a non-security sock is sent to the server 103 through the single data transmission channel.

Step S203: The router 102 receives a plurality of pieces of sock data sent by the mobile terminal 100, and the router 102 aggregates or removes redundancy from the plurality of pieces of sock data through the proxy module based on the plurality of socks and ports established through negotiation, and forwards processed single sock data to the security server 101 through the data transmission channel established by using the TCP protocol or the UDP protocol.

Step S204: The server 101 generates sock data related to security, and sends the sock data to the router 102 through the data transmission channel established by using the TCP protocol or the UDP protocol; and the proxy module of the router 102 processes the sock data that is related to security and generated by the server, copies or splits the sock data, forwards the sock data to the plurality of socks and ports established through negotiation, and sends the data to the mobile terminal 100 through different network channels.

Step S205: The mobile terminal 100 receives a plurality of pieces of sock data that is related to security and sent by the router 102, and the mobile terminal 100 aggregates or removes redundancy from the plurality of pieces of sock data related to security through the proxy module based on the plurality of socks and ports established through negotiation, and forwards processed single sock data that is related to security to the security application.

In some other embodiments, in a scenario in which the multipath transmission protocol and the proxy module are deployed on the MEC server 104, the method may further include the following steps.

Step S301: The upper-layer application of the mobile terminal 100 generates sock data; the mobile terminal 100 negotiates with the MEC server 104 based on a currently available network channel, for example, the cellular network or the Wi-Fi network, to establish a plurality of socks and ports; and the proxy module processes sock information generated by the application, copies or splits and forwards the sock information to the plurality of socks and ports established through negotiation, and sends the data to the MEC server 104 through different network channels.

Step S302: The MEC server 104 receives a plurality of pieces of sock data sent by the mobile terminal 100, and the MEC server 104 aggregates or removes redundancy from the plurality of pieces of sock data through the proxy module based on the plurality of socks and ports established through negotiation, and forwards processed single sock data to the original destination server 101 through a data transmission channel established by using the TCP protocol or the UDP protocol.

Step S303: The server 101 generates sock data, and sends the sock data to the MEC server 104 through the data transmission channel established by using the TCP protocol or the UDP protocol; and the proxy module of the MEC server 104 processes the sock data generated by the server, copies or splits the sock data, forwards the sock data to the plurality of socks and ports established through negotiation, and sends the data to the mobile terminal 100 through different network channels.

Step S304: The mobile terminal 100 receives a plurality of pieces of sock data sent by the MEC server 104, and the mobile terminal 100 aggregates or removes redundancy from the plurality of pieces of sock data through the proxy module based on the plurality of socks and ports established through negotiation, and forwards processed single sock data to the upper-layer application.

According to the context, the term "when" or "after" used in the foregoing embodiments may be interpreted as a meaning of "if", "after", "received", or "based on". Similarly, according to the context, the phrase "when it is determined that . . . " or "if (a stated condition or event) is received" may be interpreted as a meaning of "if . . . is received", "in response to determining . . . ", "in a scenario (a stated condition or event)", or "based on (a stated condition or event) being received". In addition, in the foregoing embodiments, relationship terms such as first and second are used to distinguish one entity from another entity, but do not limit any actual relationship and sequence between these entities.

All or some of the foregoing embodiments may be implemented by software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be noted that a part of the present patent application documents includes content protected by copyright. The copyright owner reserves the copyright except copies made for the patent documents or the recorded content of the patent documents in the Patent Office.

What is claimed is:

1. A router, comprising:
   at least one processor; and
   a memory connected to the at least one processor and carrying instructions that, when executed by the at least one processor, cause the router to perform operations to:
   receive collaboration information from a mobile terminal;
   run a multipath transmission protocol and identify, based on the multipath transmission protocol, the received collaboration information and send to the mobile terminal matching information corresponding to the collaboration information;
   receive and identify matching acknowledgment information sent by the mobile terminal;
   establish a plurality of at least four data transmission channels to the mobile terminal based on successful identification of matching acknowledgment information;
   receive data sent by the mobile terminal through the plurality of data transmission channels;
   remove redundancy from or aggregate the data to obtain single data; and
   forward the single data to a destination server.

2. The router according to claim 1, wherein the multipath transmission protocol is an MPTCP protocol.

3. The router according to claim 1, wherein four data transmission channels are provided, two data transmission channels established through a cellular network and two data transmission channels established through a Wi-Fi-compliant network.

4. The router according to claim 1, wherein the router is an edge router.

5. A network communications system for multipath transmission, the network communications system comprising:
   a mobile terminal;
   a router; and
   a server, wherein:
   the mobile terminal is configured to run an application and to generate data from the application and send the data to the server and to and to copy or split the data into a plurality of pieces of data and to run a multipath transmission protocol, generate collaboration information, send the collaboration information to the router, and negotiate with the router to establish a plurality of at least four data transmission channels;
   the router being configured to run the multipath transmission protocol receive the collaboration information sent by the mobile terminal, identify the collaboration information, and when the collaboration information is successfully identified, send matching information to the mobile terminal, the mobile terminal being further configured to receive and identify the matching information and to send matching acknowledgment information to the router; and
   the router receives and identifies the matching acknowledgment information, and when the matching acknowledgment information is successfully identified, establish the plurality of data transmission channels to the mobile terminal.

6. The network communications system according to claim 5, wherein the router is an edge router.

7. The network communications system according to claim 5, wherein the multipath transmission protocol is an MPTCP protocol.

8. The network communications system according to claim 5, wherein four data transmission channels are provided, two data transmission channels established through a cellular network and two data transmission channels established through a Wi-Fi-compliant network.

9. The network communications system according to claim 5, wherein the application is a user security or privacy application.

10. A mobile edge computing (MEC) server, comprising:
    at least one processor; and
    a memory connected to the at least one processor and carrying instructions that, when executed by the at least one processor, cause the router to perform operations to:
    receive collaboration information from a mobile terminal;

run a multipath transmission protocol and identify, based on the multipath transmission protocol, the received collaboration information and send to the mobile terminal matching information corresponding to the collaboration information;

receive and identify matching acknowledgment information sent by the mobile terminal;

establish a plurality of at least four data transmission channels to the mobile terminal based on successful identification of matching acknowledgment information;

receive data sent by the mobile terminal through the plurality of data transmission channels;

remove redundancy from or aggregate the data to obtain single data; and forward the single data to a destination server.

11. The MEC server according to claim 10, wherein the multipath transmission protocol is an MPTCP protocol.

12. The MEC server according to claim 10, wherein four data transmission channels are provided, two data transmission channels established through a cellular network and two data transmission channels established through a Wi-Fi network.

* * * * *